United States Patent
Wang et al.

(10) Patent No.: US 11,282,497 B2
(45) Date of Patent: Mar. 22, 2022

(54) DYNAMIC TEXT READER FOR A TEXT DOCUMENT, EMOTION, AND SPEAKER

(71) Applicant: International Business Machines Corporation, Armonk, NY (US)

(72) Inventors: Der-Joung Wang, New Taipei (TW); David Shao Chung Chen, Taipei (TW); An-Ting Tsai, Taipei (TW); Peng Chen, Taipei (TW); Chao Yuan Huang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/680,710

(22) Filed: Nov. 12, 2019

(65) Prior Publication Data
US 2021/0142785 A1    May 13, 2021

(51) Int. Cl.
  *G10L 13/10* (2013.01)
  *G10L 13/047* (2013.01)
  *G10L 13/033* (2013.01)
  *G06F 40/30* (2020.01)

(52) U.S. Cl.
  CPC ............ *G10L 13/10* (2013.01); *G06F 40/30* (2020.01); *G10L 13/033* (2013.01); *G10L 13/047* (2013.01)

(58) Field of Classification Search
  CPC ........ G10L 19/018; G10L 25/30; G06F 40/30
  USPC ................................................ 704/257–275
  See application file for complete search history.

(56) References Cited

U.S. PATENT DOCUMENTS

| | | | | |
|---|---|---|---|---|
| 5,555,343 A | * | 9/1996 | Luther | G06F 3/16 704/258 |
| 6,477,495 B1 | * | 11/2002 | Nukaga | G10L 13/10 704/260 |
| 6,876,728 B2 | | 4/2005 | Kredo et al. | |
| 8,972,265 B1 | * | 3/2015 | Lester | G10L 13/00 704/272 |
| 9,767,789 B2 | | 9/2017 | Radebaugh | |
| 10,088,976 B2 | * | 10/2018 | Kurzweil | G06F 3/04847 |

(Continued)

FOREIGN PATENT DOCUMENTS

CN    106708789 A    5/2017

OTHER PUBLICATIONS

McGlashan et al., "Voice Extensible Markup Language (VoiceXML) 3.0", W3C Working Draft Dec. 16, 2010, 91 pages, <https://www.w3.org/TR/voicexml30/>.

(Continued)

*Primary Examiner* — Jesse S Pullias
(74) *Attorney, Agent, or Firm* — Donald J. O'Brien

(57) ABSTRACT

Embodiments are disclosed for a method for dynamic text reading. The method includes performing pre-processing for a text document. Pre-processing includes determining the text document comprises an emotional statement based on an indicator of an emotion associated with the emotional statement. Pre-processing also includes identifying a speaker of the emotional statement. Further, pre-processing includes generating a role-to-voice map that associates the speaker with a digital representation of a voice for the speaker. The method additionally includes generating, based on the pre-processing, the voice for the speaker reading aloud a text of the text document using the digital representation of the voice with a tonal modulation that conveys the emotion.

20 Claims, 11 Drawing Sheets

```
<HTML><BODY><P>  502-1
                  506-1                         506-2           500A
A few minutes later, Red Riding Hood knocked on the door. The wolf jumped into bed and
pulled the covers over his nose.  "Who is it?" he called in a cackly voice. <BR>
                            508              504-2        504-1
"It's me, <b>Little Red Riding Hood</b>."😀 <BR>
   510                            512                504-3
"Oh how lovely! Do come in, my dear," croaked the wolf. <BR>

When Little Red Riding Hood entered the little cottage, she could scarcely recognize her
Grandmother. <BR>
                    504-4                                      504-5
"Grandmother! Your voice sounds so odd. Is something the matter?" she asked. <BR>

"Oh, I just have touch of a cold," squeaked the wolf adding a cough at the end to prove the
point. <BR>
        504-6
"But Grandmother! What big ears you have," said Little Red Riding Hood as she edged closer
to the bed. <BR>
         504-7                       504-8
"The better to hear you with, my dear," replied the wolf. <BR>

</P></BODY></HTML>   502-2
```

(56) References Cited

U.S. PATENT DOCUMENTS

| | | | |
|---|---|---|---|
| 2002/0193996 A1* | 12/2002 | Squibbs | H04M 1/7243 704/260 |
| 2003/0028380 A1* | 2/2003 | Freeland | G10L 13/00 704/260 |
| 2004/0059577 A1* | 3/2004 | Pickering | G10L 13/08 704/260 |
| 2004/0111271 A1* | 6/2004 | Tischer | G10L 13/033 704/277 |
| 2007/0118378 A1* | 5/2007 | Skuratovsky | G10L 13/10 704/260 |
| 2013/0204612 A1* | 8/2013 | Threewits | G09B 19/00 704/9 |
| 2017/0169811 A1 | 6/2017 | Sabbavarapu et al. | |
| 2017/0186418 A1 | 6/2017 | Mairano et al. | |
| 2017/0263248 A1* | 9/2017 | Gruber | G06F 40/166 |
| 2019/0107927 A1* | 4/2019 | Schriber | G06F 16/34 |
| 2019/0196666 A1 | 6/2019 | Kurzweil et al. | |

OTHER PUBLICATIONS

Mell et al., "The NIST Definition of Cloud Computing", Recommendations of the National Institute of Standards and Technology, Sep. 2011, 7 pages.

\* cited by examiner

`<HTML><BODY><P>` ⌐502-1

A few minutes later, Red Riding Hood knocked on the door. The wolf jumped into bed and pulled the covers over his nose. "Who is it?" he called in a cackly voice. `<BR>`

"It's me, `<b>`Little Red Riding Hood`</b>`." 😀 `<BR>`

"Oh how lovely! Do come in, my dear," croaked the wolf. `<BR>`

When Little Red Riding Hood entered the little cottage, she could scarcely recognize her Grandmother. `<BR>`

"Grandmother! Your voice sounds so odd. Is something the matter?" she asked. `<BR>`

"Oh, I just have touch of a cold," squeaked the wolf adding a cough at the end to prove the point. `<BR>`

"But Grandmother! What big ears you have," said Little Red Riding Hood as she edged closer to the bed. `<BR>`

"The better to hear you with, my dear," replied the wolf. `<BR>`

`</P></BODY></HTML>`

```
<HTML><BODY><P>                                                    — 502-1

Some minutes later, Red Riding Hood knocked on the door.  The wolf jumped into bed, and pulled the covers over his
nose.  <span role="Wolf">"Who is it?"</span> he called in a cackly voice. <BR>
                                                                    — 504-1

<span role="Little Red Riding Hood" emotion="happy">"It's me, <b>Little Red Riding Hood</b>."</span> 😀
<BR>                                                                        — 514-2
     — 504-2         — 516-2

<span role="Wolf" emotion="happy">"Oh how lovely!  Do come in, my dear," ."</span> croaked the wolf.<BR>
                    — 516-3                                          — 514-3           — 504-3

When Little Red Riding Hood tried to enter the little cottage, she could scarcely recognize her Grandmother. <BR>
                                                                                                       — 504-4

<span role="Little Red Riding Hood" emotion="worry">"Grandmother!  Your voice sounds … odd.  Is something the
matter?"</span> she asked. <BR>       — 504-5        — 516-5
— 514-5

<span role="Wolf" emotion="sick" >"Oh, I just have something of a cold,"</span> squeaked the wolf, and added a
cough at the end just to prove it true. <BR>    — 516-6                                      — 514-6

<span role="Little Red Riding Hood" emotion="shock">"But Grandmother!  What big ears you have,"</span> said
Little Red Riding Hood as she edged closer to the bed. <BR>      — 504-7      — 516-7                 — 514-7

<span role="Wolf">"The better to hear you with, my dear,"</span> replied the wolf. <BR>
                                                        — 514-8                     — 504-8

</P></BODY></HTML>
```

FIG. 5B

DYNAMIC TEXT READER FOR A TEXT DOCUMENT, EMOTION, AND SPEAKER

BACKGROUND

The present disclosure relates to text reading, and more specifically, to dynamic text reading.

A text reader can be a computer application or suite of applications that processes a document stored in electronic form, and through a connected speaker, reads the text aloud. However, the text reader can sound like what it is: a computer simulating speech.

SUMMARY

Embodiments are disclosed for a method for dynamic text reading. The method includes performing pre-processing for a text document. Pre-processing includes determining the text document comprises an emotional statement based on an indicator of an emotion associated with the emotional statement. Pre-processing also includes identifying a speaker of the emotional statement. Further, pre-processing includes generating a role-to-voice map that associates the speaker with a digital representation of a voice for the speaker. The method additionally includes generating, based on the pre-processing, the voice for the speaker reading aloud a text of the text document using the digital representation of the voice with a tonal modulation that conveys the emotion.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5A is a diagram of an example text document, in accordance with some embodiments of the present disclosure.

FIG. 5B is a diagram of an example pre-processed text document, in accordance with some embodiments of the present disclosure.

Figure 1:
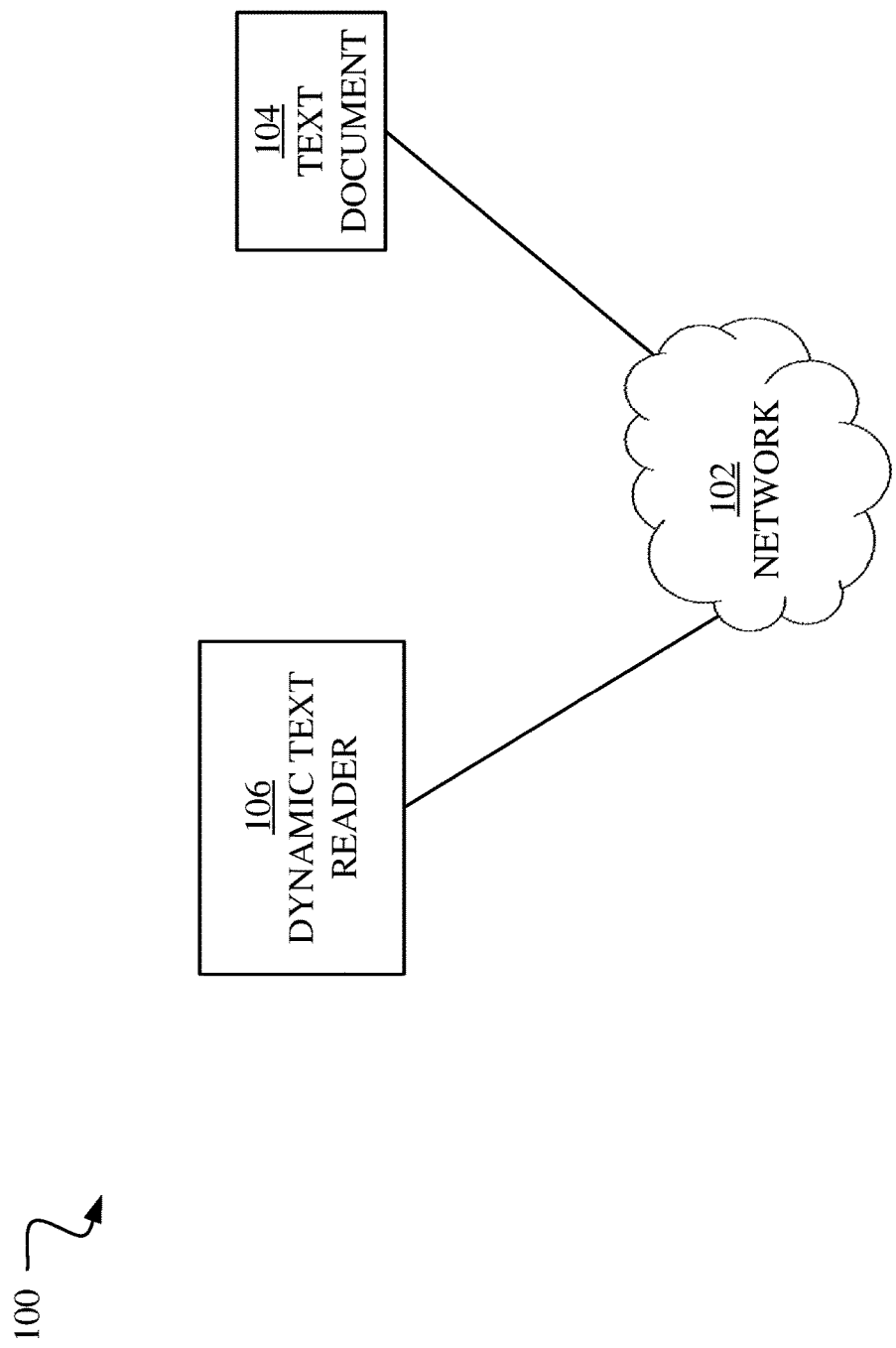
FIG. 1 is a block diagram of an example system for dynamic text reading, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Existing computer applications that perform text to speech generally use a plain voice to read aloud. A plain voice is a voice that can sound human, but without the emphasis, and/or emotion that a human being uses to emphasize certain words or feelings. As such, text to speech applications can lack the emotional and/or tonal variations that can make reading more interesting or vivid for the listener. Text to speech applications can include screen readers, which can read the text being displayed upon a monitor, such as the text of a web page. However, screen readers, such as accessibility (a11y) tools, suffer from the same lack of vocal variation as other text to speech applications. The term, a11y, is a numeronym, used as shorthand for accessibility. Numeronyms can be words that incorporate numbers, to form an abbreviation, for example. The numeronym, a11y, can represent a rating of the accessibility of a computer system, e.g., web site, to all people, including those with a lack of- or limited-sight and hearing, for example.

Accordingly, embodiments of the present disclose can provide a dynamic text reader that generates a voice with emotional and/or tonal variations. The variations can be determined based on the punctuation and other markings associated with the text of a document. For example, text that is marked with rich text formats, e.g., bold can be read aloud at a higher volume than unmarked text. Additionally, the dynamic text reader can determine language or specific emphasis to add to the voice based on emojis in the document. For example, the dynamic text reader can read a statement with joy if the statement is appended with a smiley face emoji in the text.

FIG. 1 is a block diagram of an example system 100 for dynamic text reading, in accordance with embodiments of the present disclosure. The system 100 includes a network 102, a text document 104, and a dynamic text reader 106. The network 102 can be one or more electronic computer communication networks, including local area networks (LANS) and wide area networks (WANS). In some embodiments, the network 102 can be the Internet. The text document 104 can be an electronic document, such as a word processing document, or the hypertext markup language (HTML) documents that define web pages on the world wide web (WWW).

The dynamic text reader 106 can be a computer application that accesses the text document 104 over the network 102. Additionally, the dynamic text reader 106 can generate a dynamic voice that reads the text of the text document 104 aloud with vocal and tonal variations to imbue the voice with an emotional quality. In some embodiments, the dynamic text reader 106 can determine emotions from text using a text sentiment analysis service. Further, the dynamic text reader 106 can identify different speakers within a dialog represented in the text document 104. Accordingly, the dynamic text reader 106 can determine the vocal and tonal variations based on the speaker, sentiment, and the punctuation and other markings in the text document 104.

Figure 2:
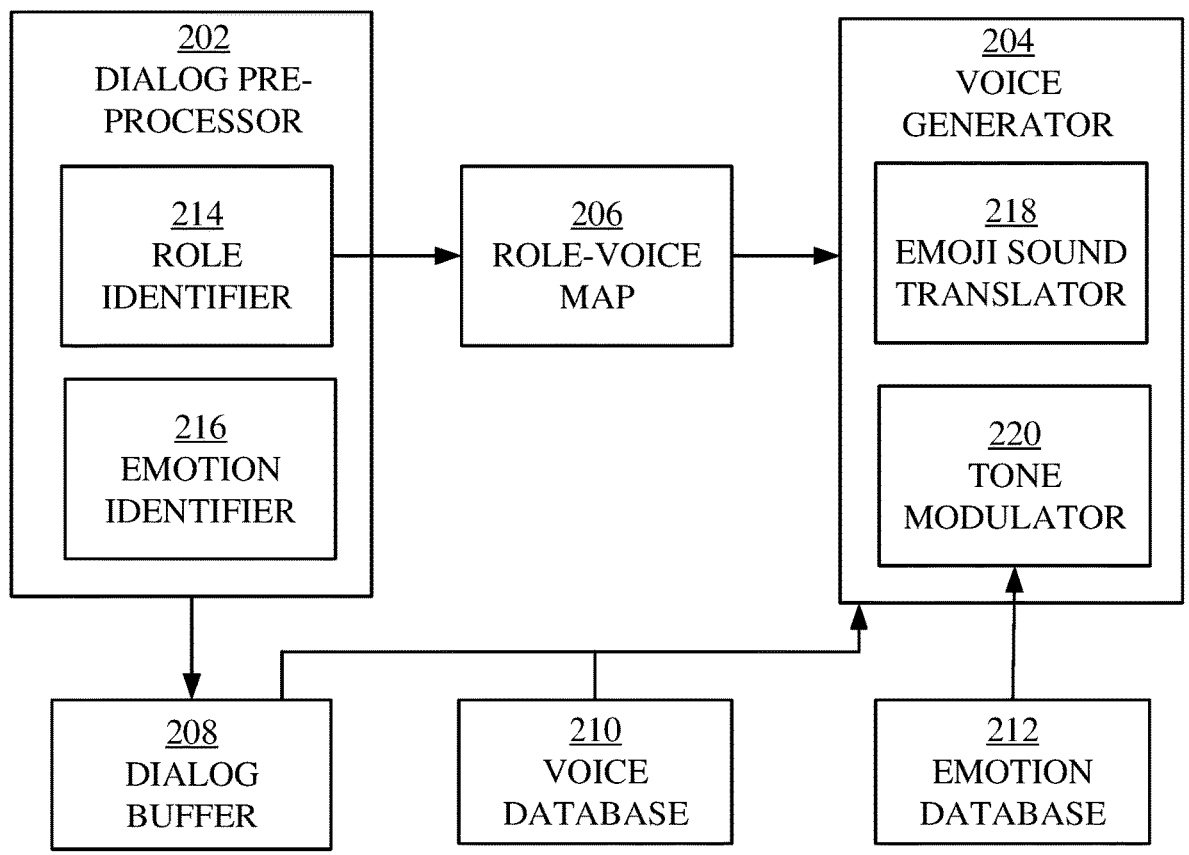
FIG. 2 is a block diagram of an example dynamic text reader, in accordance with some embodiments of the present disclosure.

FIG. 2 is a block diagram of an example dynamic text reader 200, in accordance with some embodiments of the present disclosure. The dynamic text reader 200 may be similar to the dynamic text reader 106 for reading aloud the text document 104 described with respect to FIG. 1. Referring back to FIG. 2, the dynamic text reader 200 includes a dialog pre-processor 202, voice generator 204, role-voice map 206, dialog buffer 208, voice database 210, and emotion database 212.

The dialog pre-processor 202 can identify dialog, speakers, and information that is relevant to an emotional characteristic of the dialog. More specifically, the dialog pre-processor 202 includes a role identifier 214 and an emotion identifier 216. The role identifier 214 can identify the different speakers of dialog. Additionally, the role identifier 214 can modify the text document to include a speaker tag for specific lines of dialog. The speaker tag can specify a name, or role, of the speaker. The emotion identifier 216 can identify emotions for the dialog. The emotion identifier 216 can identify emotions based on punctuation, emojis, text emphasis, and the like. Additionally, the emotion identifier 216 can modify the text document to include an emotion tag for specific lines of dialog. In order for the voice generator 204 to identify specific emotions, for example, when reading, these tags can be added to the text using the dialog buffer 208. In this way, the dialog buffer 208 makes it possible to prevent direct modification to the original text.

The voice generator 204 can use the modified document from the dialog pre-processor 202 to generate a signal that, when played by a speaker, reads the text document 104 aloud with vocal and tonal variation to convey emotion. More specifically, the voice generator 204 can include an emoji sound translator 218 and a tone modulator 220. The emoji sound translator 218 can identify specific sounds to associate with an emoji. For example, if the text document 104 includes a laughing emoji, the emoji sound translator 218 can translate the laughing emoji to the sound of laughter for the voice generator 204. The tone modulator 220 can modulate the tonal variation based on the emotion identified for a line of dialog. The tone modulator 220 can use a tonal modulation that is based on the emotion tags produced by the emotion identifier 216. In this way, the tone modulator 220 can make the reading voice sound happy, sad, fearful, and the like.

The voice generator 204 can also use the role-voice map 206, dialog buffer 208, voice database 210, and emotion database 212 to generate the reading voice. In some embodiments, the dynamic text reader 200 can write the modified text document to the dialog buffer 208. Accordingly, the voice generator 204 can read the dialog from the dialog buffer 208 before generating the reading voice. The voice database 210 can include vocal representations of various speakers. The speakers are also referred to herein as characters and roles. Accordingly, the role-voice map 206 can represent a mapping between the various speakers, characters, roles and the vocal representation of the speaker in the voice database 210. The emotion database 212 can include representations of different vocal effects to apply to the reading voice to imbue the voice with a specified emotion. Thus, the voice generator 204 can generate the reading voice based on the role of the speaker, the identified emotion, and any translated emojis.

Figure 3:
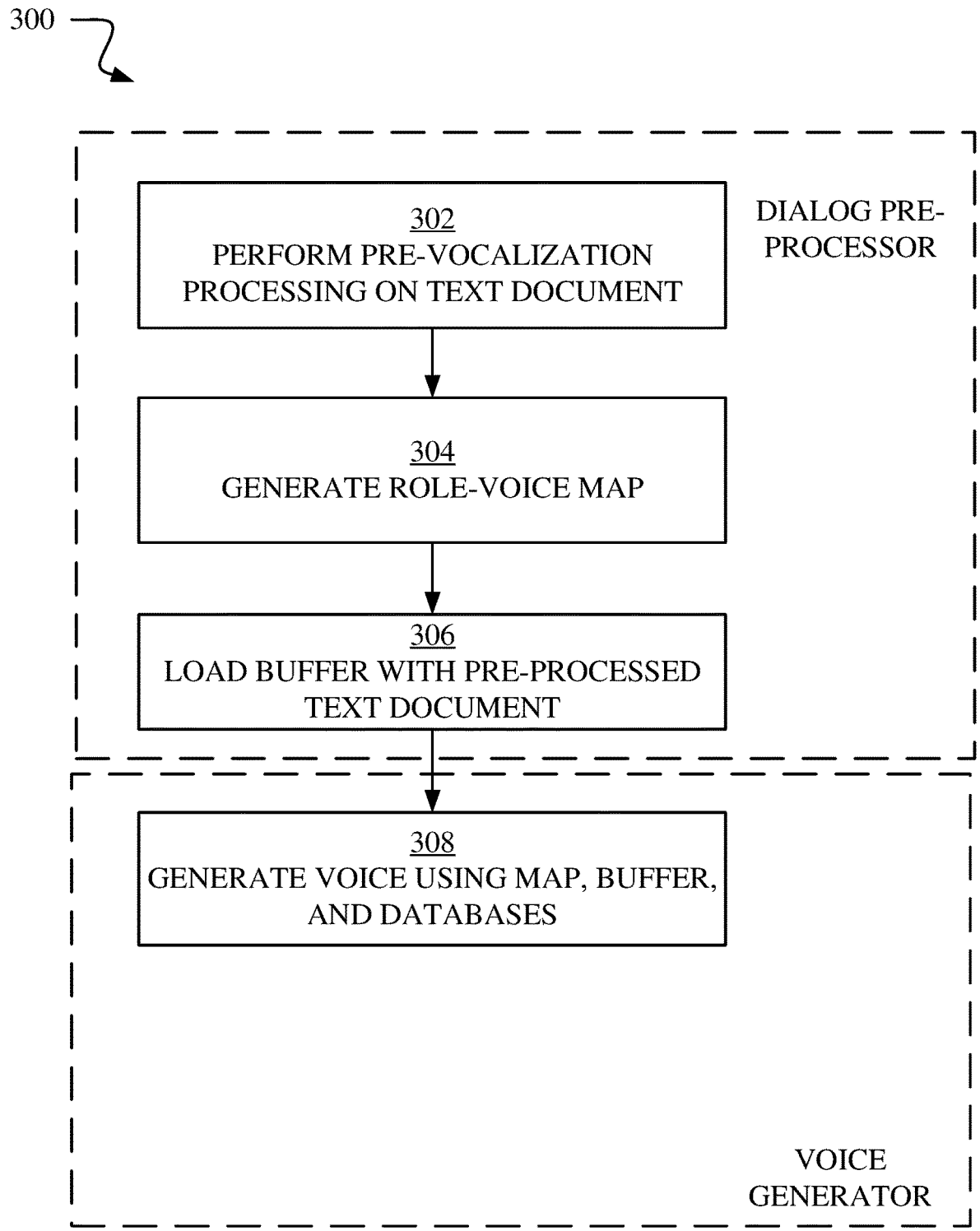
FIG. 3 is a process flow diagram of a method for dynamic text reading, in accordance with some embodiments of the present disclosure.

FIG. 3 is a process flow diagram of a method 300 for dynamic text reading, in accordance with some embodiments of the present disclosure. The method 300 can be performed by a dialog pre-processor and a voice generator, such as the dialog pre-processor 202 and voice generator 204. More specifically, the dialog pre-processor 202 can perform operations 302 through 306 of the method 300. Further, a voice generator, such as the voice generator 204 can perform operation 308.

At operation 302, the dialog pre-processor 202 performs pre-vocalization processing (pre-processing) on a text document, such as the text document 104. Pre-processing can include identifying emphatic character fonts such as rich text format fonts that emphasize a word or characters. Some example font formats can include bold, underline, strike-through, italic, and the like. Additionally, pre-processing can involve identifying speakers of dialog in the text document 104. Further, the dialog pre-processor 202 can determine emotions associated with the dialog.

At operation 304, the dialog pre-processor 202 can generate a role-voice map, such as the role-voice map 206. Generating the role-voice map 206 can involve associating each of the speakers with their respective voices. Thus, the dialog pre-processor 202 can search the voice database 210 for the name(s) of the speaker(s) of dialog identified in operation 302 and retrieve the associated digital representation of the speaker's voice. Further, this digital representation can be stored locally in association with the speaker's identity in the role-voice map 206.

At operation 306, the dialog pre-processor 202 can buffer the pre-processed text document into a buffer. In some embodiments, the buffer can be the dialog buffer 208.

At operation 308, the voice generator 204 generates a reading voice for the text document 104 based on the dialog buffer 208, the role-voice map 206, voice database 210, and the emotion database 212. Generating the reading voice in this way can provide a dynamic listening experience by providing different voices for different roles. Additionally, generating the reading voice in this way can provide a dynamic listening experience by adding emotional content to the reading voice.

Figure 4:
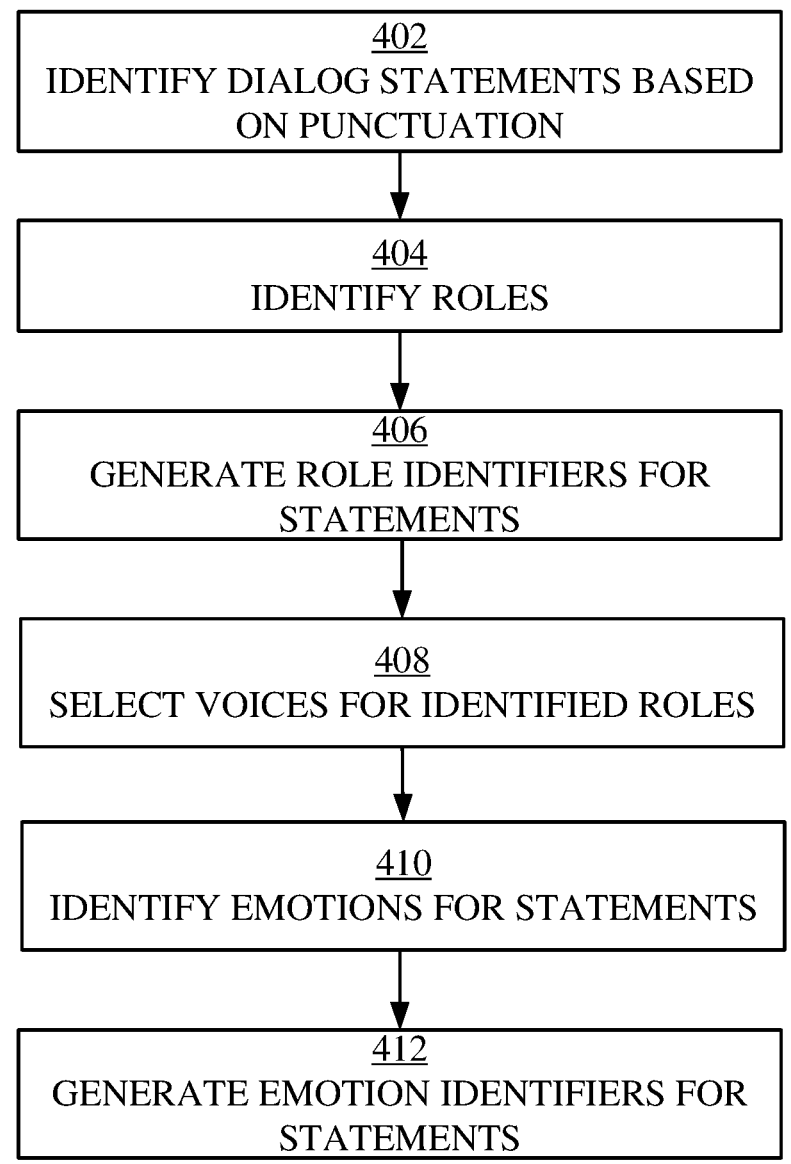
FIG. 4 is a process flow diagram of an example method for dynamic text reading of a text document, in accordance with embodiments of the present disclosure.

FIG. 4 is a process flow diagram of an example method 400 for dynamic text reading of a text document, in accordance with embodiments of the present disclosure. The method 400 can be performed on the text document 104 by a dialog pre-processor, such as the dialog pre-processor 202 described with respect to FIG. 2. Referring back to FIG. 4, at operation 402, the dialog pre-processor 202 can identify dialog statements based on the punctuation of the text document 104. The punctuation can include quotation marks, question marks, exclamation marks, and the like.

At operation 404, the dialog pre-processor 202 can identify roles for each of the statements. In some embodiments, the dialog pre-processor 202 can use techniques of natural language understanding (NLU) to identify the roles. NLU refers to a sub-field of natural language processing that deals with reading comprehension using machine learning techniques.

At operation 406, the dialog pre-processor 202 can generate role identifiers for the dialog statements. For example, the dialog pre-processor 202 can insert speaker tags into the dialog statements that identifies the speakers.

At operation 408, the dialog pre-processor 202 can select voices for the identified roles. In some embodiments, the dialog pre-processor 202 can write the mapping of the role to the voice in a role-voice map, such as the role-voice map 206. In some embodiments, other voices in the voice database 210 can be associated with descriptions that include, for example, gender identity, age, and tone. Thus, the dialog pre-processor 202 can analyze the text document to find descriptions in the text of the speakers. Further, the dialog pre-processor 202 can use the voice descriptions that can be considered a match to the speaker to select a voice from the voice database 210 that the voice generator 204 uses for the speaker's dialog.

At operation 410, the dialog pre-processor 202 can identify the emotions for the statements. In some embodiments, the dialog pre-processor 202 can include a tone analyzer. The tone analyzer can be a machine-learning algorithm that identifies emotions in textual statements based on the meaning, context, and punctuation of the statement.

At operation 412, the dialog pre-processor 202 can generate emotion identifiers for the statements. In some embodiments, the dialog pre-processor 202 can insert an emotion tag within statements that the dialog pre-processor 202 identifies as having an associated emotion.

FIG. 5A is a diagram of an example text document 500A, in accordance with some embodiments of the present disclosure. The text document 500A is similar to the text document 104 described with respect to FIG. 1. More specifically, the text document 500A is an HTML document containing a portion of the text of the fairy tale, Little Red Riding Hood. Documents, such as HTML documents, can include paired tags that can define various characteristics of a document. For example, the preliminary HTML 502-1 includes corresponding terminal HTML 502-2 with standard tags indicating this is a paragraph <P> in the body <BODY> of an HTML <HTML> page. The corresponding terminal HTML 502-2 represents the end of the paragraph </P> and body </B> of the HTML </HTML> page.

The text document 500A includes eight statements, 504-1 through 504-8 (also referred to herein collectively as 504) which terminate with the <BR> tag. The <BR> tag is a non-content tag, indicating a break in the paragraph. The <BR> tag is one of the few HTML tags that is not used with a terminating tag.

As shown, the text document 500A references various speakers, or roles 506-1, 506-2, i.e., Red Riding Hood and the wolf, respectively. Additionally, the text document 500A includes quotation marks 508 around each line of dialog. Further, the text document 500A includes bold tags 510. The bold tags 510 can indicate to a web browser that the enclosed text is displayed with bold emphasis. The text document 500A also includes an emoji reference 512. The code, 😀, is a numeric Unicode identifier for a grinning face emoji.

FIG. 5B is a diagram of an example pre-processed text document 500B, in accordance with some embodiments of the present disclosure. The pre-processed text document 500B can represent the result of pre-processing text document 500A. The pre-processed text document 500B includes many of the elements of text document 500A. However, for the sake of clarity, not all elements from text document 500A are labeled in pre-processed text document 500B. In addition to the preliminary HTML 502-1, terminal HTML 502-2, statements 504-1 through 8, roles 506-1, 506-2, quotation marks 508, and bold tags 510, the pre-processed text document 500B includes speaker tags 514, and emotion tags 516. The pre-processed text document 500B does not include the emoji reference 512 because, after pre-processing, the emoji reference 512 can be translated to an emotion tag 516 and/or dialog statements, and sounds.

According to some embodiments, the dialog pre-processor 202 can determine which of the statements 504 are dialog statements. Not all of the statements 504 are dialog statements. Thus, the pre-processed text document 500B does not includes speaker tags 514 for all the statements 504. More specifically, statement 504-4 is not a dialog statement and thus does not include a speaker tag. However, the statement 504-4 can be read aloud as narration in a predetermined default voice from the voice database 210. In this example, the statement 504-4 also does not include an emotion tag 516. As such, the dynamic text reader 106 may not modify the reading voice sound to convey a specific emotion. In some embodiments, statements such as the narration example above can include an emotion tag. In such embodiments, the voice generator 204 can configure the reading voice sound to convey a predetermined emotion.

In statement 504-1, the speaker tags 514<span></span> encompasses the speaker's role, "Wolf," which the voice generator 204 can use to identify a voice in the voice database 210. The voice generator 204 may thus use the wolf's voice when reading aloud, "Who is it?"

In statement 504-2, the speaker tags 514-2 identify Little Red Riding Hood's voice. Additionally, the dialog pre-processor 202 translates the emoji reference 512 from text document 500A into emotion tag 516-2 of pre-processed text document 500B. In this example, the emotion is, "happy." Accordingly, the voice generator 204 can configure the reading voice to convey a happy vocal and/or tonal quality when stating, "It's me," in Little Red Reding Hood's voice.

In statement 504-3, the speaker tags 514-3 and emotion tags 516-3 specify that the reading voice is the Wolf's happy voice.

In statement 504-4, there are no speaker and emotion tags. In some embodiments, the voice generator 204 can use a predetermined default voice to read statements, such as statement 504-4. A default voice can represent a narrator's voice, for example. Such voices can be configured using various tonal characteristics, such as frequency ranges, resonance, volume, and the like.

In statement 504-5, the speaker tags 514-5 and emotion tags 516-5 specify the reading voice to be Little Red Riding Hood's with worry. In statement 504-6, the speaker tags 514-6 and emotion tags 516-6 specify the reading voice to be the Wolf's sick voice. In statement 504-7, the speaker tags 514-7 and emotion tags 516-7 specify the reading voice to be Little Red Riding Hood's voice and shock. In statement 504-8, there is no emotion tag. However, the speaker tags 514-7 specify the reading voice to be the Wolf's.

Figure 6A:
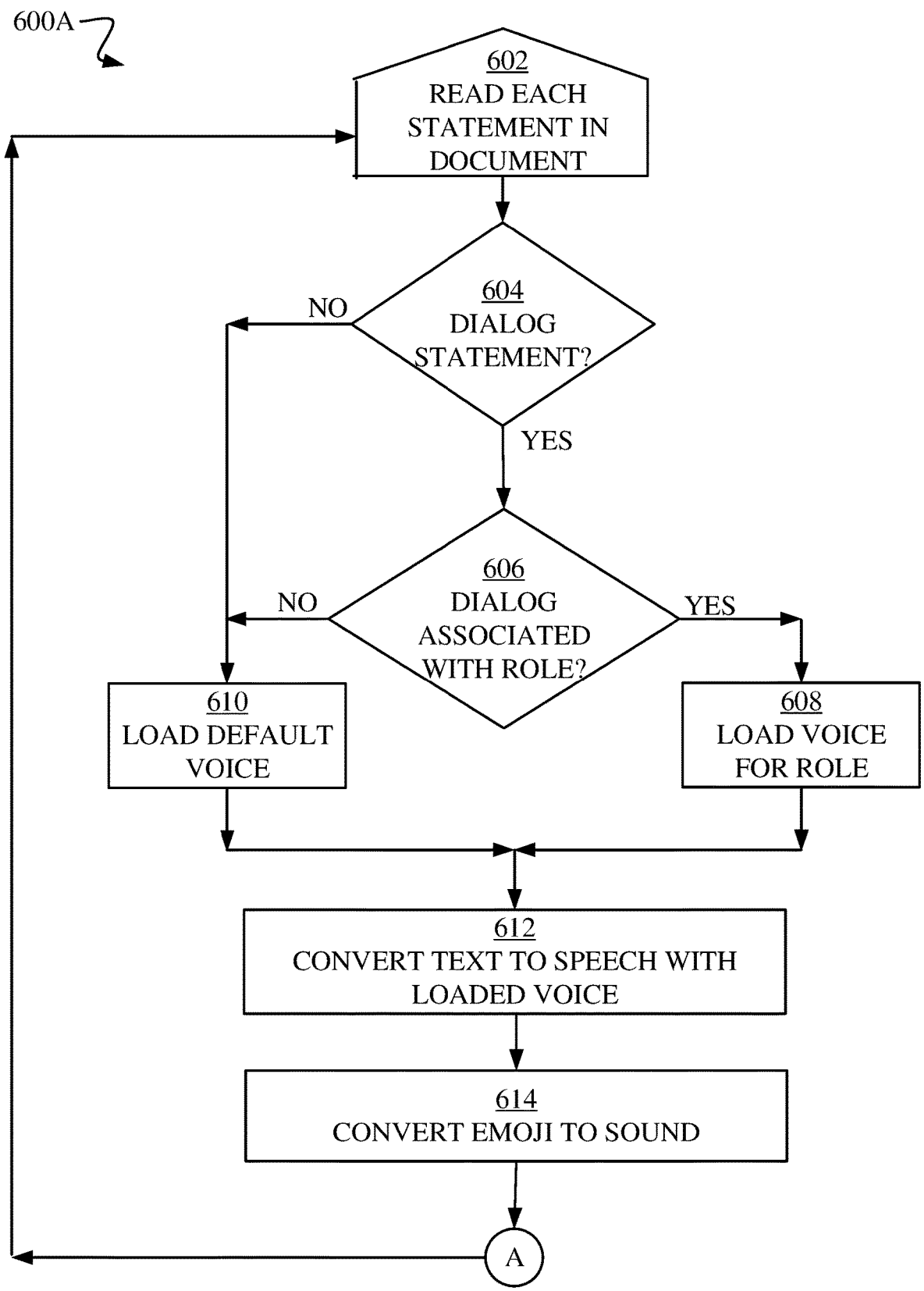
FIGS. 6A and 6B are process flow diagrams of a method for generating a voice using a dynamic text reader, in accordance with some embodiments of the present disclosure.
Figure 6B:
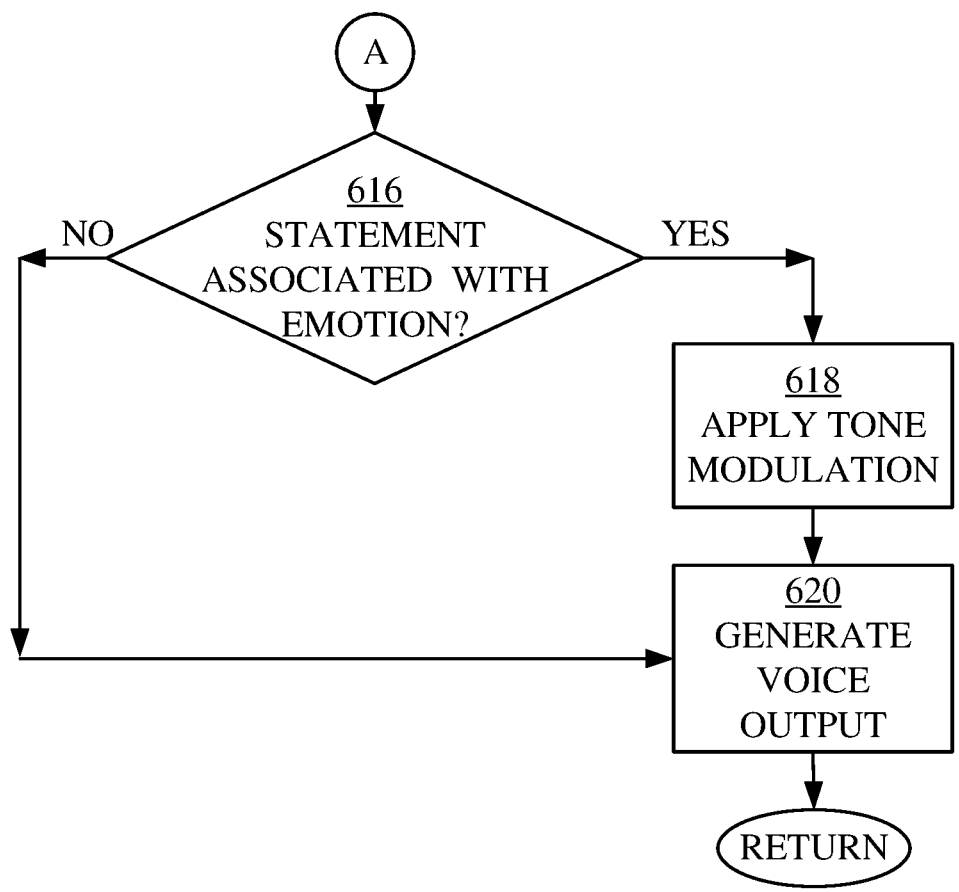

FIGS. 6A and 6B are process flow diagrams of a method 600 for generating a voice using a dynamic text reader, in accordance with some embodiments of the present disclosure. The method 600 can be performed by the voice generator 204 on a pre-processed text document, such as the pre-processed text document 500B described with respect to FIG. 5B. The voice generator 204 can perform the operations 602 through 620 for each statement in the pre-processed text document 500B. As stated previously, the dialog pre-processor 202 can write the pre-processed document, such as the pre-processed text document 500B to the dialog buffer 208. Accordingly, at operation 602, the voice generator 204 may read a statement, such as the statements 504, from the dialog buffer 208.

At operation 604, the voice generator 204 may determine whether the statement 504 is a dialog statement. As stated previously, the inclusion of a speaker tag, such as the speaker tags 514 can indicate whether the statement 504 is a dialog statement. If the statement 504 is a dialog statement, control flows to operation 606.

At operation 606, the voice generator 204 can determine whether the dialog statement is associated with a role. The example speaker tags 514 identify speaker roles. Thus, if the speaker tag 514 identifies a role, control flows to operation 608.

At operation 608, the voice generator 204 can load the voice for the identified role. Loading a voice can involve loading a computer program into memory that makes the component sounds of a specific voice that can be combined into words and other sounds by the dynamic text reader 106. Control from operation 608 flows to operation 612.

In some scenarios, the dialog pre-processor 202 may not be able to match a role to specific dialog. In such cases, the speaker tags may specify the role as "unknown." In such cases, the voice generator 204 can use a default voice for dialog by unknown speakers. Thus, if the voice generator 204 determines that there is no role associated with the dialog statement, control flows from operation 606 to operation 610. Similarly, if, at operation 604, the voice generator 204 determines that the statement is not a dialog statement, control flows to operation 610.

At operation 610, the voice generator 204 can load a default voice. As stated previously, the default voice can be a voice that is pre-configured based on select tonal and other audio qualities. Also similar to operation 608, control from operation 610 flows to operation 612.

At operation 612, the voice generator 204 can convert text to speech with the voice loaded during operations 608 or 610. Converting text to speech can involve generating the words of the statements 504 in the loaded voice.

At operation 614, the voice generator 204 can convert an emoji to sound. In the example of FIGS. 5A and 5B, the emoji 512 was converted to an emotion. However, in some cases, an emoji can represent a sound, such as laughter, applause, and so on. In such cases, the dialog pre-processor 202 can leave the emoji in the pre-processed document. Additionally, the voice generator 204 can use an emoji database (not shown) to identify the associated sound. The sounds of the Emoji would be generated by loading the sounds from a set of pre-recorded audio files. As understood by one of ordinary skill, each emoji is represented by a Unicode value. The emoji database includes a mapping table that maps the Unicode values to corresponding audio files. Further, the voice generator 204 can generate the corresponding audio file. In this way, the dynamic text reader can imbue the reading with the emotional aspects of any emojis included in the text. Additionally, control flows to placeholder A, where the method 600 continues in FIG. 6B.

FIG. 6B is a process flow diagram continuing the method 600 for generating a voice using a dynamic text reader, in accordance with some embodiments of the present disclosure. The placeholder A represents the continuation of flow from operation 614 of FIG. 6A. Control thus flows to operation 616.

At operation 616, the voice generator 204 determines whether the statement 504 is associated with an emotion. For example, if the statement 504 includes an emotion tag, such as the emotion tags 516, the voice generator 204 can determine that the statement 504 is associated with an emotion. Accordingly, control may flow to operation 618.

At operation 618, the voice generator 204 can apply tone modulation to the generated reading voice for the statement 504. The voice generator 204 can determine the tone modulation based on a lookup into the emotion database 212. Accordingly, the voice generator 204 can apply the looked up tone modulation to the generated reading voice statement.

At operation 620, the voice generator 204 can generate the voice output. Generating the voice output can involve sending the generated reading voice of the statement 504 to a speaker for pronouncement.

As noted previously, control flows from FIG. 6A to FIG. 6B through placeholder A. Further, from operation 620, control returns to the placeholder A in FIG. 6A. As shown in FIG. 6A, control flows from placeholder A to operation 602, where the voice generator 204 repeats the method 600 for the next statement 504 in the pre-processed pre-processed text document 500B.

Figure 7:
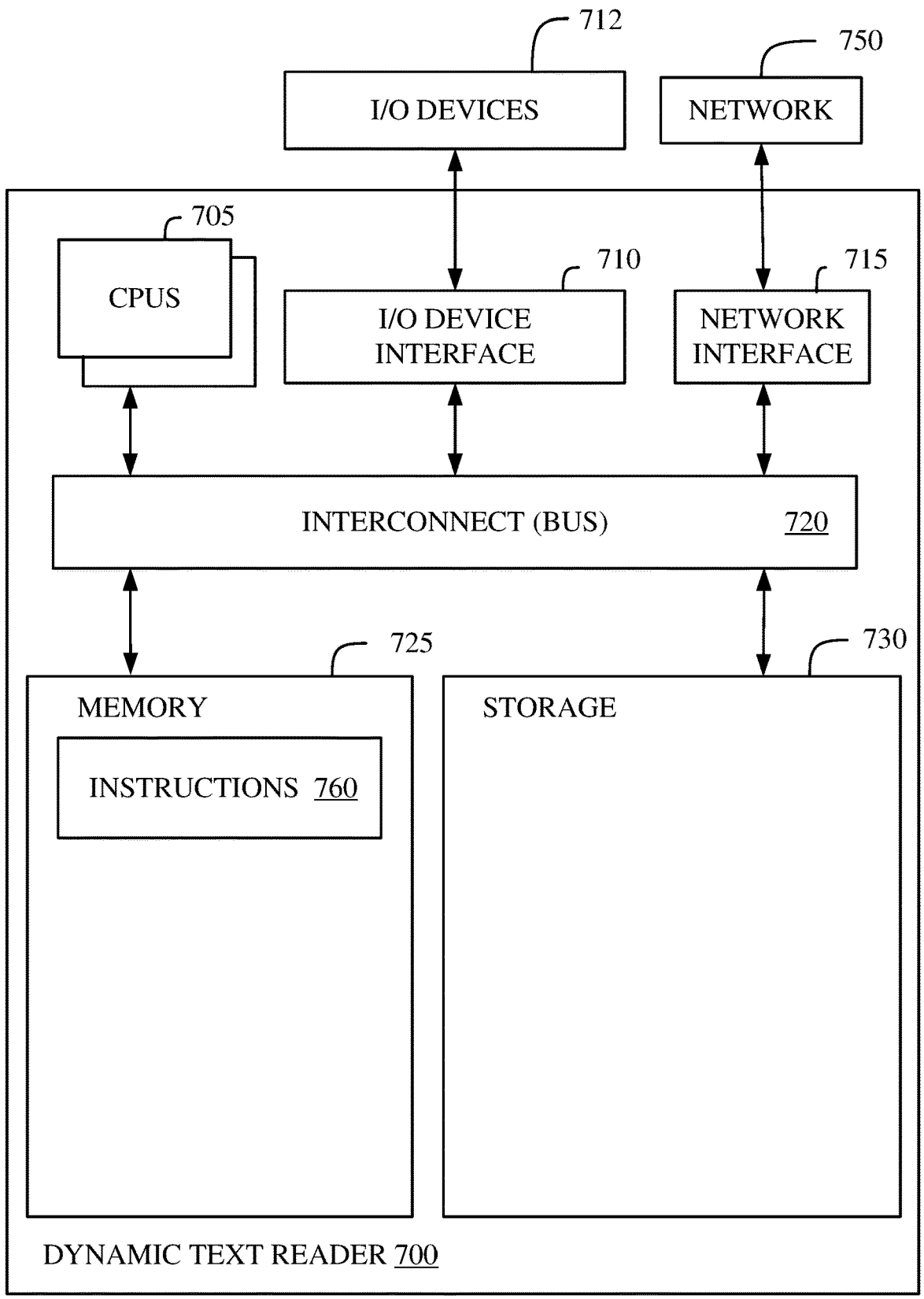
FIG. 7 is a block diagram of an example dynamic text reader, in accordance with some embodiments of the present disclosure.

FIG. 7 is a block diagram of an example dynamic text reader 700, in accordance with some embodiments of the present disclosure. In various embodiments, the dynamic text reader 700 is similar to the dynamic text reader 200 and can perform the methods described in FIGS. 3, 4, 6A, and 6B and/or the functionality discussed in FIGS. 1, 2, 5A, and 5B. In some embodiments, the dynamic text reader 700 provides instructions for the aforementioned methods and/or functionalities to a client machine such that the client machine executes the method, or a portion of the method, based on the instructions provided by the dynamic text reader 700. In some embodiments, the dynamic text reader 700 comprises software executing on hardware incorporated into a plurality of devices.

The dynamic text reader 700 includes a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or the storage 730. The interconnect 720 is used to move data, such as programming instructions, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random access memory (e.g., static random access memory (SRAM), dynamic random access memory (DRAM), or Flash). The storage 730 is generally included to be representative of a non-volatile memory, such as a hard disk drive, solid state device (SSD), removable memory cards, optical storage, and/or flash memory devices. Additionally, the storage 730 can include storage area-network (SAN) devices, the cloud, or other devices connected to the dynamic text reader 700 via the I/O device interface 710 or to a network 750 via the network interface 715.

In some embodiments, the memory 725 stores instructions 760. However, in various embodiments, the instructions 760 are stored partially in memory 725 and partially in storage 730, or they are stored entirely in memory 725 or entirely in storage 730, or they are accessed over a network 750 via the network interface 715.

Instructions 760 can be processor-executable instructions for performing any portion of, or all, any of the methods described in FIGS. 3, 4, 6A, and 6B and/or the functionality discussed in FIGS. 1, 2, 5A, and 5B.

In various embodiments, the I/O devices 712 include an interface capable of presenting information and receiving input. For example, I/O devices 712 can present information to a listener interacting with dynamic text reader 700 and receive input from the listener.

The dynamic text reader 700 is connected to the network 750 via the network interface 715. Network 750 can comprise a physical, wireless, cellular, or different network.

In some embodiments, the dynamic text reader 700 can be a multi-user mainframe computer system, a single-user system, or a server computer or similar device that has little or no direct user interface but receives requests from other computer systems (clients). Further, in some embodiments, the dynamic text reader 700 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary dynamic text reader 700. In some embodiments, however, individual components can have greater or lesser complexity than as represented in FIG. 7, components other than or in addition to those shown in FIG. 7 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
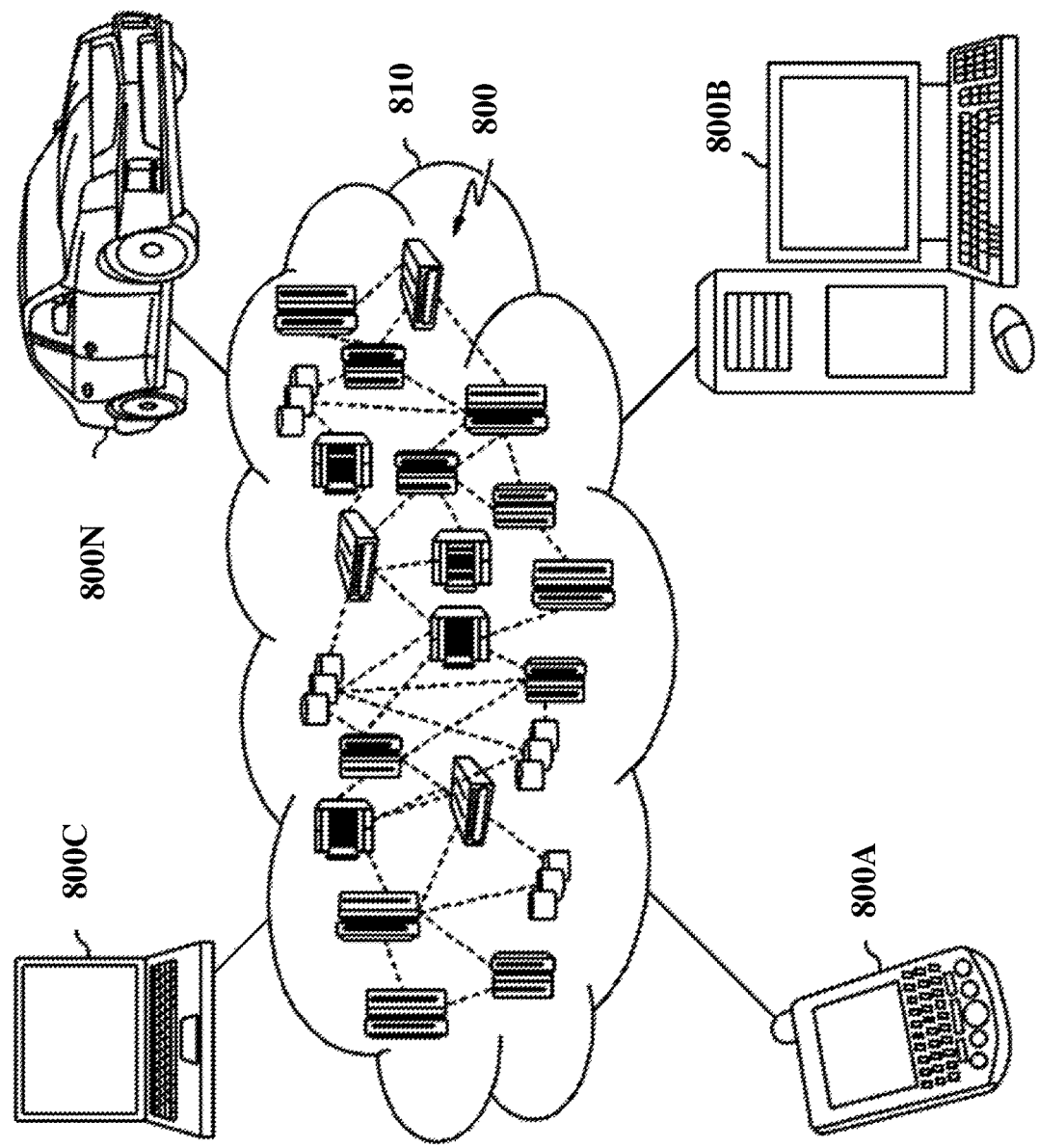
FIG. 8 depicts a cloud computing environment, according to some embodiments of the present disclosure.

FIG. 8 is a cloud computing environment 810, according to some embodiments of the present disclosure. As shown, cloud computing environment 810 includes one or more cloud computing nodes 800. The cloud computing nodes 800 can perform the methods described in FIGS. 3, 4, 6A, and 6B and/or the functionality discussed in FIGS. 1, 2, 5A, and 5B. Additionally, cloud computing nodes 800 can communicate with local computing devices used by cloud consumers, such as, for example, personal digital assistant (PDA) or cellular telephone 800A, desktop computer 800B, laptop computer 800C, and/or automobile computer system 800N. Further, the cloud computing nodes 800 can communicate with one another. The cloud computing nodes 800 can also be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
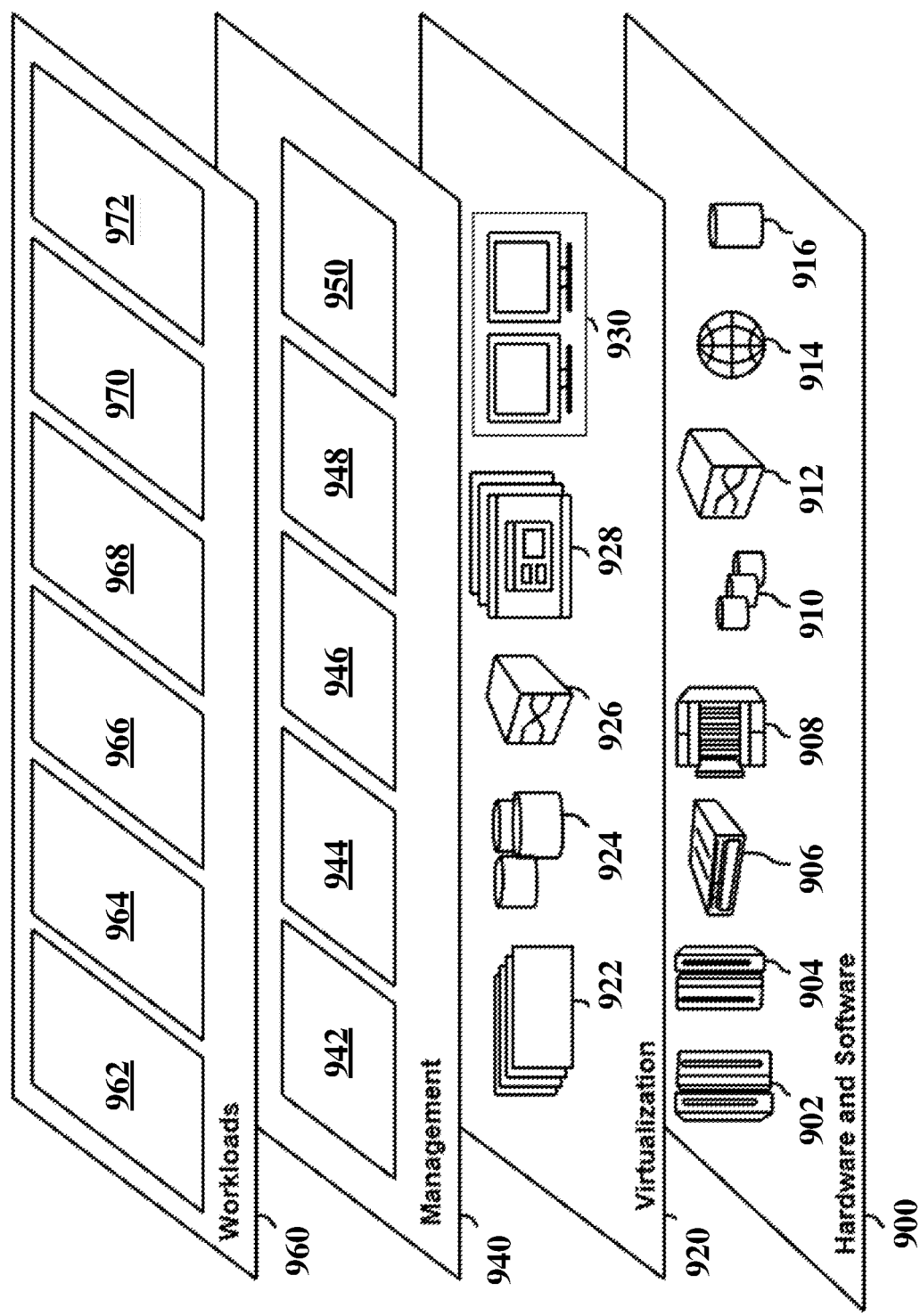
FIG. 9 depicts abstraction model layers, according to some embodiments of the present disclosure.

FIG. 9 is a set of functional abstraction model layers provided by cloud computing environment 810 (FIG. 8), according to some embodiments of the present disclosure, is shown. It should be understood in advance that the components, layers, and functions shown in FIG. 9 are intended to be illustrative only and embodiments of the disclosure are not limited thereto. As depicted below, the following layers and corresponding functions are provided.

Hardware and software layer 900 includes hardware and software components. Examples of hardware components include: mainframes 902; RISC (Reduced Instruction Set Computer) architecture based servers 904; servers 906; blade servers 908; storage devices 910; and networks and networking components 912. In some embodiments, software components include network application server software 914 and database software 916.

Virtualization layer 920 provides an abstraction layer from which the following examples of virtual entities can be provided: virtual servers 922; virtual storage 924; virtual networks 926, including virtual private networks; virtual applications and operating systems 928; and virtual clients 930.

In one example, management layer 940 can provide the functions described below. Resource provisioning 942 provides dynamic procurement of computing resources and other resources that are utilized to perform tasks within the cloud computing environment. Metering and Pricing 944 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service level management 948 can allocate suitable processing power and memory to process static sensor data. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment can be utilized. Examples of workloads and functions which can be provided from this layer include: mapping and navigation 962; software development and lifecycle management 964; virtual classroom education delivery 966; data analytics processing 968; transaction processing 970; and dynamic text reader 972.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for dynamic text reading, comprising:
   performing a pre-processing for a text document by:
      determining the text document comprises an emotional statement based on an indicator of an emotion associated with the emotional statement;
      identifying a speaker of the emotional statement;
      finding a description of the speaker by analyzing the text document to find a description in a text of one or more other speakers;
      identifying a role of the speaker based on the description and a voice description from a voice database; and
      generating a role-to-voice map that associates the speaker with a digital representation of a voice for the speaker, wherein the digital representation enables a computer program to generate a plurality of component sounds of the voice for the speaker, wherein the plurality of component sounds are combined into words; and
   generating, based on the pre-processing, the voice for the speaker reading aloud a text of the text document using the digital representation of the voice with a tonal modulation that conveys the emotion.

2. The method of claim 1, further comprising generating a pre-processed document comprising:
   the text of the text document;
   an emotional indicator associating the emotional statement and the emotion; and
   a speaker indicator associating the speaker with the emotional statement.

3. The method of claim 1, wherein the indicator of the emotion comprises an emoji.

4. The method of claim 3, further comprising determining the emotion based on the emoji.

5. The method of claim 3, further comprising:
   retrieving an audio file associated with a Unicode value for the emoji; and
   generating a sound using the audio file.

6. The method of claim 1, wherein the indicator of the emotion comprises a visual text emphasis.

7. The method of claim 1, further comprising retrieving the digital representation of the voice from the voice database.

8. The method of claim 1, further comprising determining the tonal modulation based on an emotion database.

9. A computer program product comprising program instructions stored on a computer readable storage medium, wherein the computer readable storage medium is not a transitory signal per se, the program instructions executable by a processor to cause the processor to perform a method comprising:
   performing a pre-processing for a text document by:
      determining the text document comprises an emotional statement based on an indicator of an emotion associated with the emotional statement, wherein the indicator of the emotion comprises an emoji;
      identifying a speaker of the emotional statement;
      finding a description of the speaker by analyzing the text document to find a description in a text of one or more other speakers;
      identifying a role of the speaker based on the description and a voice description from a voice database; and
      generating a role-to-voice map that associates the speaker with a digital representation of a voice for the speaker, wherein the digital representation enables a computer program to generate a plurality of component sounds of the voice for the speaker, wherein the plurality of component sounds are combined into words; and generating, based on the pre-processing, the voice for the speaker reading aloud a text of the text document using the digital representation of the voice with a tonal modulation that conveys the emotion.

10. The computer program product of claim 9, the method further comprising generating a pre-processed document comprising:

the text of the text document;

an emotional indicator associating the emotional statement and the emotion; and a speaker indicator associating the speaker with the emotional statement.

11. The computer program product of claim 9, the method further comprising determining the emotion based on the emoji.

12. The computer program product of claim 9, the method further comprising:

retrieving an audio file associated with a Unicode value for the emoji; and generating a sound using the audio file.

13. The computer program product of claim 9, wherein the indicator of the emotion comprises a visual text emphasis.

14. The computer program product of claim 9, the method further comprising retrieving the digital representation of the voice from the voice database.

15. The computer program product of claim 9, the method further comprising determining the tonal modulation based on an emotion database.

16. A system comprising:

a computer processing circuit; and a computer-readable storage medium storing instructions, which, when executed by the computer processing circuit, are configured to cause the computer processing circuit to perform a method comprising:

performing a pre-processing for a text document by:

determining the text document comprises an emotional statement based on an indicator of an emotion associated with the emotional statement, wherein the indicator of the emotion comprises an emoji;

identifying a speaker of the emotional statement;

finding a description of the speaker by analyzing the text document to find a description in a text of one or more other speakers;

identifying a role of the speaker based on the description and a voice description from a voice database;

generating a role-to-voice map that associates the speaker with a digital representation of a voice for the speaker, wherein the digital representation enables a computer program to generate a plurality of component sounds of the voice for the speaker, wherein the plurality of component sounds are combined into words; and generating, based on the pre-processing, the voice for the speaker reading aloud a text of the text document using the digital representation of the voice with a tonal modulation that conveys the emotion; and generating a pre-processed document comprising:

the text of the text document;

an emotional indicator associating the emotional statement and the emotion; and a speaker indicator associating the speaker with the emotional statement.

17. The system of claim 16, the method further comprising determining the emotion based on the emoji.

18. The system of claim 16, the method further comprising:

retrieving an audio file associated with a Unicode value for the emoji; and generating a sound using the audio file.

19. The system of claim 16, wherein the indicator of the emotion comprises a visual text emphasis.

20. The system of claim 16, the method further comprising retrieving the digital representation of the voice from the voice database.

* * * * *